A. RALOFF, Jr.
PISTON RING COMPRESSING TOOL.
APPLICATION FILED FEB. 24, 1920.
1,383,152. Patented June 28, 1921.
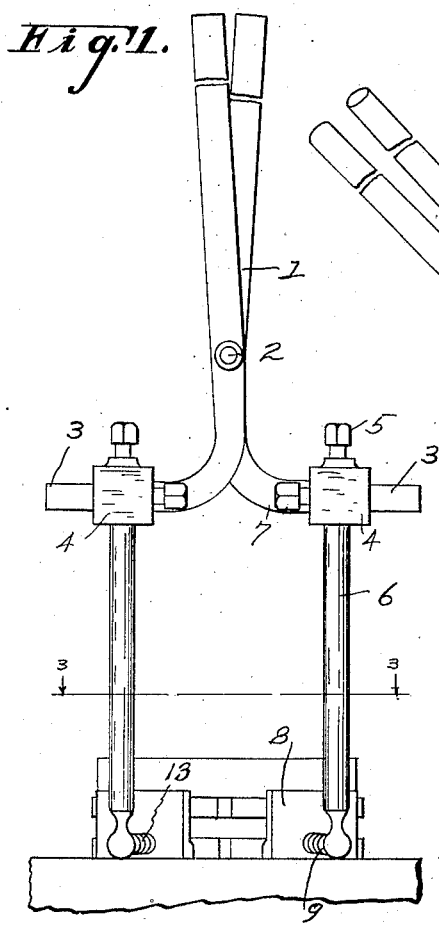
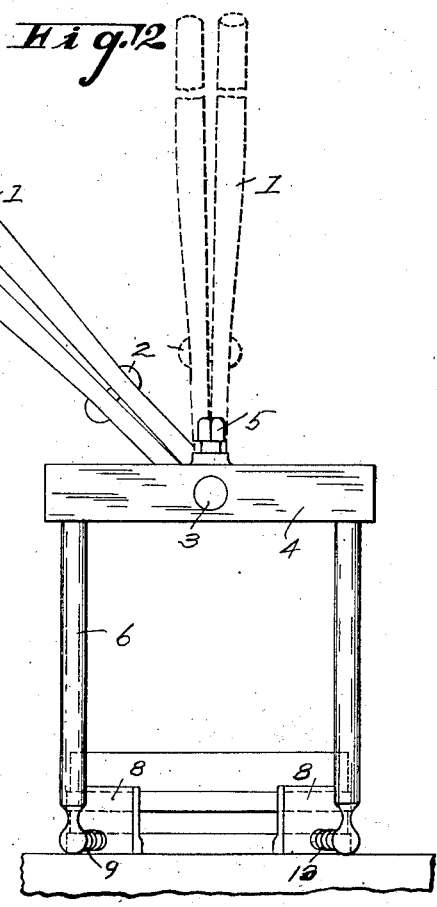
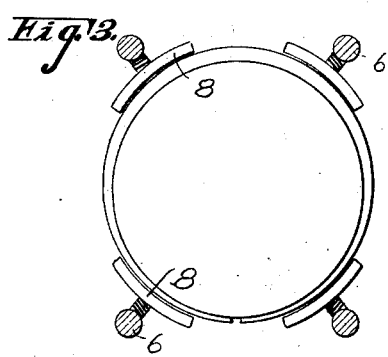
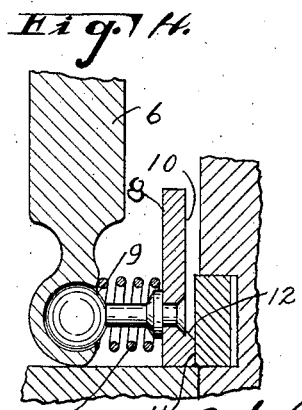
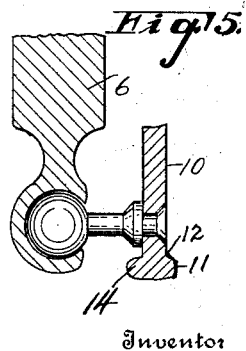
Inventor
Adolph Raloff Jr.
By Erwin Wheeler & Woodard
Attorneys
Witness

UNITED STATES PATENT OFFICE.

ADOLPH RALOFF, JR., OF THIENSVILLE, WISCONSIN, ASSIGNOR, BY DIRECT AND MESNE ASSIGNMENTS, OF TWO-FIFTHS TO THEADORE H. WEGMANN AND ONE-FIFTH TO A. G. RALOFF, BOTH OF THIENSVILLE, WISCONSIN.

PISTON-RING-COMPRESSING TOOL.

1,383,152.   Specification of Letters Patent.   Patented June 28, 1921.

Application filed February 24, 1920. Serial No. 360,927.

*To all whom it may concern:*

Be it known that I, ADOLPH RALOFF, Jr., a citizen of the United States, residing at Thiensville, county of Ozaukee, and State of Wisconsin, have invented new and useful Improvements in Piston-Ring-Compressing Tools, of which the following is a specification.

This invention relates to piston ring compressing tools.

Objects of this invention are to provide an improved piston inserting tool which will facilitate the insertion of pistons into cylinders; which may be used to readily and quickly grasp and hold the piston while it is being manipulated; and which will effectively and successively compress the piston rings.

Further objects are to provide a piston ring tool of simple, rugged, and substantial design capable of withstanding severe use; which may be readily manufactured from standard forms of materials such as bars, rods, etc.; and which may be readily adjusted either to fit any size of piston or to operate upon a piston located in a relatively inaccessible place.

In the drawings:

Figure 1 is a side elevation of the tool showing a piston partly inserted into a cylinder.

Fig. 2 is a similar view at right angles to Fig. 1 showing the handles in a different position of adjustment.

Fig. 3 is a section on the line 3—3 of Fig. 1.

Fig. 4 is a detail view of one of the shoes and associated parts.

Fig. 5 is a detail view showing a modified form of shoe.

The tool comprises a pair of handles 1 pivotally joined at 2 and extended in opposite directions to form the arms 3. Yokes 4 are adjustably mounted upon the arms 3, and are provided with set screws 5 for clamping the yokes 4 to the arms 3. Rods 6 are adjustably carried by the yokes 4 by passing the rods through openings in such yokes and securing them in place by set screws 7. Adjacent the lower portion of each rod a plurality of shoes 8 are universally mounted by means of a ball and socket joint 9.

These shoes 8 have a concave inner face 10 and a concave rib 11 projecting from such face adjacent the normally bottom edge of the shoe. A beveled portion 12 leads from the inner cylindrical surface 10 to the top, or most distant portion, of the rib 11, so that a gradual slope is provided. It will be noted that the rib 11 serves to press the piston ring inwardly of the outer surface of the piston so that the ring clears the inner wall of the cylinder.

The line along which the thrust is communicated to the shoes is caused to pass adjacent the ribs by having the center line of the universal, or ball and socket joint, pass adjacent such rib 11. This arrangement causes an unbalancing of the shoes, as the upper portions are extended to span one or more additional rings, and tend to make them top heavy, with a resulting tendency to turn out of position. This turning is prevented by providing helical springs 13 which are arranged about the universal joint and bear against the rods 6 and shoes 8. The friction provided by the springs 13 prevents the rotation of the shoes about the axes of the universal joints.

Fig. 5 shows another form of shoe in which the bottom part 14 has been made the heavier part so that the shoe is automatically maintained in its correct position.

Fig. 2 shows one of the possible relative adjustments of parts that the device may have. The handles 1 have been rotated about the axis of the parts 3 and the set screws 5 tightened to lock the handles in their inclined position. This arrangement of the handles is especially suited to operating upon a piston which is located in a place relatively difficult of access, for instance, partly beneath the dash or other portion of the body of an automobile. The dotted lines show the normal position of the handles.

The operation of the device is as follows: After the piston has been partly inserted in the cylinder with the lowermost ring resting upon the upper edge of the cylinder, the device is placed over the piston in such a position that the rods 6 are arranged about the piston and the bottom portion of the shoes 8 are resting upon the top of the cylinder. The handles 1 are now pressed toward each other causing the upper edge of the concave faces of the shoes to engage the piston and one or more of the upper rings, and the ribs 11 to engage the lowermost ring. The ribs compress the lowermost ring and cause the diameter of such ring to become less than that of the piston. The piston now slips, or may be pushed, downwardly into the cylinder, the successive rings riding inwardly upon the beveled portion 12, decreasing in diameter, and finally passing into the cylinder.

When a piston with widely spaced rings is to be manipulated, the rods 6 are extended downwardly a material distance below the yokes 4 and thereafter clamped in position by the set screws 7. The adjustment, for variations in diameter of pistons, is secured by moving the yokes 4 inwardly or outwardly upon the portions 3 and thereafter clamping them in adjusted position by means of the set screws 5.

It will be seen that a rugged, simple, and readily applied device has been produced, and that the major part of the device can be made from standard shapes of material, such as rods, bars, etc.

It will further be seen that great universality of application is secured by the various adjustments, and that any one of several widely different types of pistons may be readily handled by this device.

I claim:—

1. A piston ring compressing tool, comprising a plurality of universally mounted shoes for engaging the piston ring at a plurality of points, means for operating said shoes, and means adjustably and operatively connecting said shoes and operating means.

2. A piston ring compressing tool comprising a pair of pivotally joined operating handles, a yoke adjustably carried by each of said handles, rods adjustably mounted in the yokes, and a shoe universally mounted upon each of said rods.

3. A piston ring tool comprising a pair of handles; a pluralitiy of arms operatively connected to said handles; piston ring engaging members to engage the ring at a plurality of points, one carried by and movably joined to each of said arms, and adapted to be moved inwardly thereby and automatically position itself.

4. A piston ring tool comprising a plurality of arms adapted to be positioned around the piston with certain of said arms extending downwardly upon opposite sides of said piston, a plurality of independent shoes carried by said arms and adapted to bear upon said piston ring, and means acting through said arms for causing said shoe to compress said piston ring.

5. A piston ring tool comprising a plurality of shoes arranged to be placed about and in contact with the piston, each of said shoes comprising a rounded inner concave face and a projecting rib formed at the lower portion of and extending inwardly from said concave face; a pair of operating handles; and intermediate means operatively connecting said operating handles and said shoes.

6. A piston ring compressing tool, comprising a pair of pivotally joined members, each member consisting of a handle and an outwardly extending portion, a yoke mounted upon each of the outwardly extending portions, and arranged to be adjustably locked in any desired relative position, a pair of rods adjustably mounted in each yoke, and extending at right angles thereto, and arranged to be positioned about the piston, and a shoe for contacting with the piston ring universally mounted upon each of said rods.

7. A shoe, for a piston ring clamping tool, having a substantially cylindrical concave face, a rib extending from said concave face, and a beveled portion extending from the surface of the concave face to the top of the rib.

8. A piston ring tool comprising a plurality of shoes arranged to be placed about and in contact with the piston, each of said shoes comprising a rounded inner concave face and a projecting rib formed at the lower portion of and extending inwardly from said concave face; a pair of operating handles; and intermediate means operatively connecting said operating handles and said shoes, whereby said rib is caused to compress the rings to a diameter smaller than that of the piston.

In testimony whereof I affix my signature in the presence of two witnesses.

ADOLPH RALOFF, Jr.

Witnesses:
A. R. WOOLFOLK, Jr.,
O. C. WEBER.